UNITED STATES PATENT OFFICE.

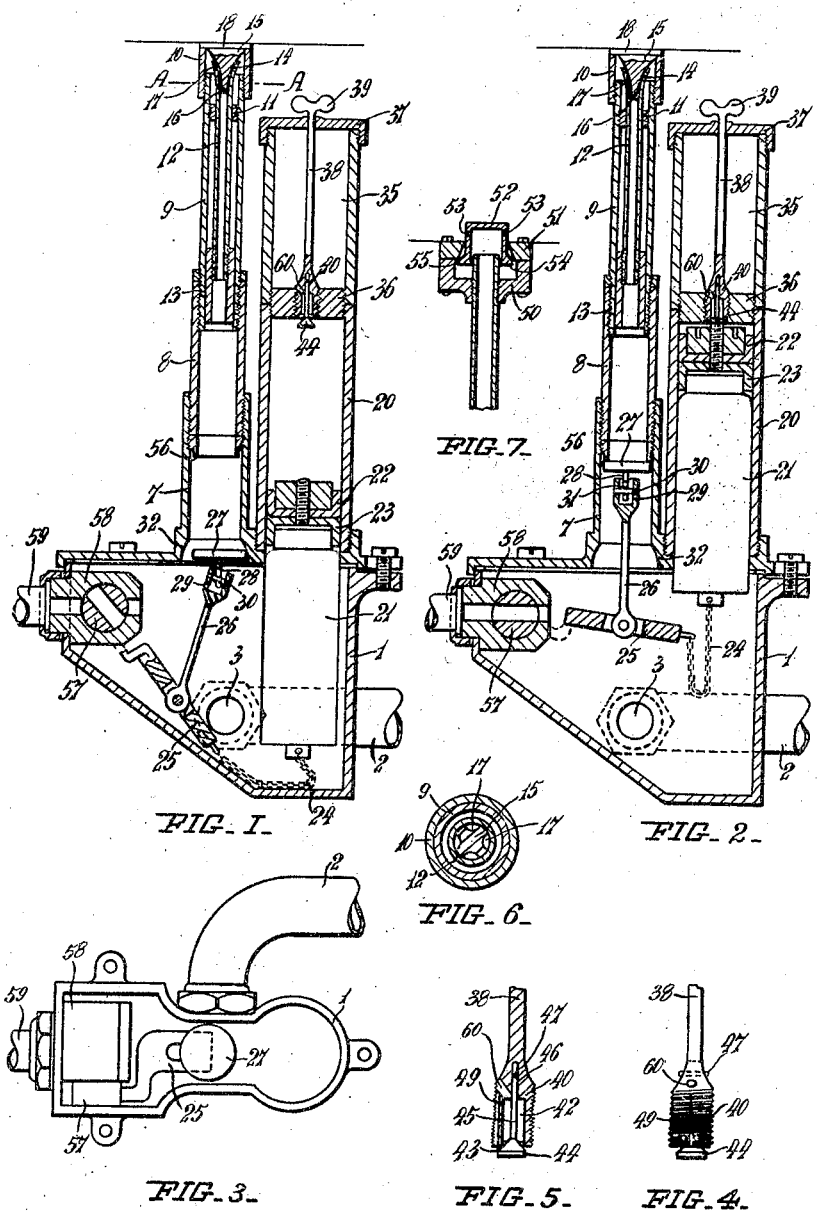

DONALD ELDER, OF ONEHUNGA, NEW ZEALAND.

APPARATUS FOR SPRAYING GARDENS, ROADS, AND THE LIKE.

1,121,618.   Specification of Letters Patent.   Patented Dec. 22, 1914.

Application filed February 25, 1914. Serial No. 820,896.

*To all whom it may concern:*

Be it known that I, DONALD ELDER, a citizen of the Dominion of New Zealand, and residing at Onehunga, in the Provincial District of Auckland, in the Dominion of New Zealand, have invented certain new and useful Improvements in Apparatus for Spraying Gardens, Roads, and the like, of which the following is a specification.

This invention relates to means employed for watering roads, lawns, gardens, greenhouses and the like by spraying and consists of apparatus whereby the supply to a spraying nozzle is shut off after a predetermined quantity of water has passed through the apparatus.

A chamber connected to a supply of water under pressure has an outlet communicating with a spraying nozzle and a cylinder in which is a piston connected by a flexible medium with a weighted lever carrying a clapper valve adapted to close the said outlet.

The movement of the piston under pressure of water in the chamber causes the lever to be raised and the supply of water to the spraying nozzle to be cut off.

A single apparatus may be employed or the lever may be fixed to the plug of the stop cock which is opened to admit water to a second apparatus. Any desired number of apparatus may be thus connected together.

The invention will now be more particularly described by reference to the accompanying drawing.

Figure 1, is a longitudinal sectional elevation showing the positions of the parts before admission of water to the apparatus. Fig. 2, is a longitudinal sectional elevation showing the positions of the parts, after a predetermined quantity of water has passed passed through the apparatus. Fig. 3, is a plan of the lower part of the apparatus, Fig. 4, an elevation, and Fig. 5, a sectional elevation of a regulating plug. Fig. 6, an enlarged sectional plan on line A—A, Fig. 1, and Fig. 7, a sectional elevation of a sprayer.

The chamber 1 is connected by a pipe 2 to a high pressure water supply and has ordinary stop cock (not shown on the drawing). The pipe 2 communicates with the chamber 1 by the port 3. A pipe 7 connects the chamber to a pipe 8, to which is attached a sprayer.

Any suitable sprayer may be employed and I have shown in Figs. 1, 2 and 6, a construction of sprayer which is not of my invention, wherein a pipe 9 has a fixed cap 10 the top of which is open. The pipe also has a fixed guide block 11.

A pipe 12 having fixed upon its lower end a tubular guide 13 is slidable through the block 11 and has a bell mouthed end 14. A conical spray producer 15 projects upwardly from a block 16 which is fixed within the pipe 12 and has channels 17 in its periphery for the passage of water.

A disk 18 integral with the spray producer closes down upon the top of the cap when the sprayer is not in operation In bringing the sprayer into operation the pressure of the water projects the pipe 12 telescopically beyond the pipe 9 until its movements are limited by contact of the guide 13 with the block 11.

A cylinder 20 connected to the chamber 1 is fitted with a piston 21 which has reversed bucket washers 22 and 23. A chain 24 attached at one end to the lower end of the piston 21, is attached at its other end to a weighted lever 25.

A rod 26 connects the lever 25 to a clapper valve 27, the stem 28 of which enters a cup 29 formed upon the top of the rod. A pin 30 passes through a slot 31 in the stem 28 to enable the clapper valve to move freely in a lateral direction within a recess formed by making a shoulder 32 at the base of the pipe 7.

A reservoir 35 connected to the cylinder 20 by a screwed union 36 is provided with a screwed cap 37, through which a stem 38 projects and is fitted with wings 39. A plug 40 screws into the union 36 and is fixed to the stem 38. The plug has a cavity 42 and at its base has a valve seating 43. A valve 44 adapted to close upon the seating 43 is guided by its stem 45, which passes freely into a hole 46 formed in the top of the plug. The valve is prevented from falling out of the plug by a pin 47 passing through the plug and through a slot in the stem 45.

A groove 49 tapering in width and depth from its larger and lower end is cut vertically across the screw threads of the plug.

In operation the cylinder 20 is first filled with water by removing cap 37 and plug 40. The reservoir 35 then contains no water. When water is admitted through pipe 2 to the chamber 1, it rises through the pipes 7, 8 and 12, to the sprayer, which continues to play for a period predetermined by adjusting the plug 40. The pressure of water forces the piston 21 into its cylinder 20, and the water contained in the cylinder is forced through the groove 49 into the reservoir 35, the pressure of the water closing the valve 44 upon its seating. The time which the piston takes to rise in its cylinder is regulated by adjusting the plug 40 in the union 36 so that the tapered groove 49 is opened to a greater or less degree for the passage of the water. The period of travel of the piston can also be determined by the length of the cylinder 20. The supply of water in cylinder 20 is maintained by the slight escape past the bucket washers 22 and 23. The piston 21 while rising draws up the chain 24 and raises the lever 25, thereby lifting the clapper valve 27 until the same reaches the shoulder 32. The pressure of the water then forces and holds the valve 27 on to a seating 56 at the bottom of the pipe 8, thereby cutting off the supply of water to the sprayer.

The lever 25 may be fulcrumed upon a pin in any ordinary way when a single apparatus is used but if a series of apparatus is in use then the lever is fixed to and operates the plug 57 of a stop cock 58. A pipe 59 leading from the cock 58 to the chamber 1 of a second apparatus, and in a similar manner other apparatus may be connected up to work in series. The water passes from the pipe 2, through the chamber 1 and through the pipe 59 to a second apparatus constructed similarly to the apparatus herein described, the clapper valve and the piston meanwhile remaining in their raised positions.

When the cock in the pipe 2 is closed, the reduction of the pressure allows the piston 21 and the clapper valve 27 to fall, and by the fall of the piston the water contained in the reservoir 35 escapes through a port 60 into the cavity 42 and past the valve 44 back into the cylinder 20 thereby leaving the apparatus ready for further use. The water displaced by the fall of the piston escapes through the sprayer, the clapper valve falling from its seat before the piston descends.

The sprayer shown in Figs. 1, 2 and 6, operates by the water pressure forcing the pipe 12 telescopically through the pipe 9 until its movement is arrested by contact of the guide 13 with the block 11. The cap 10 is then raised a considerable height from the ground.

Fig. 7 shows a sprayer which is used when my invention is employed for spraying roads and comprises a box 50 having a cover 51, through a tapering hole in which slides a cylindrical nozzle 52 having spraying holes 53. The nozzle has a beveled valve face 54 adapted to close upon a seating 55 formed upon the cover 51. Normally the nozzle 52 is in such a position that the spraying holes 53 are lower than the cover 51 of the box. The water pressure raises the nozzle 52, so that water passes through the holes 53. The nozzle rises only a short distance above the ground and if struck by the wheel of a vehicle the nozzle is temporarily pressed into the cover, the tapering hole therein facilitating the movement of the nozzle.

What I do claim and desire to secure by Letters Patent of the United States is:—

1. Spraying apparatus of the kind described comprising in combination a water chamber supplied with water under pressure, a cylinder connected at its lower end thereto and closed at its upper end, a piston adapted to reciprocate in said cylinder and constantly under the influence of the water in said chamber, an outlet pipe leading from said water chamber, a nozzle connected to said outlet pipe, a valve controlling the flow of water through said pipe, and a flexible connection between said piston and said valve, said connection permitting a predetermined movement of said piston before it operates said valve.

2. Spraying apparatus of the kind described, comprising in combination a water chamber, supplied with water under pressure, a cylinder in continuous communication therewith, a piston adapted to reciprocate in said cylinder and constantly under the influence of the water in said chamber, an outlet pipe leading from said water chamber, a nozzle connected to said outlet pipe, a valve controlling the flow of water through said pipe, a weighted lever means connecting said valve to said weighted lever, and a chain connecting said piston to said lever.

3. Spraying apparatus of the kind described comprising in combination a water chamber, means for admitting water under pressure to said chamber, an outlet pipe leading from said water chamber, a nozzle connected to said outlet pipe, a valve controlling the flow of water through said pipe, means, controlled by the pressure of the water, for automatically closing said valve a predetermined time after the admission of the water under pressure to said chamber, and means adapted to put said water chamber into communication with a water chamber of a second similar apparatus upon the closure of said valve.

4. Spraying apparatus of the kind described comprising in combination a water chamber supplied with water under pressure, a cylinder connected thereto, a piston adapted to reciprocate in said cylinder and movable under the pressure of the water, an outlet pipe leading from said water chamber, a nozzle connected to said outlet pipe, a valve controlling the flow of water through said pipe, a weighted lever means connecting said valve to said weighted lever, a flexible connection between said piston and said lever, and a cock, operated by said lever, adapted to put said water chamber into communication with a water chamber of a second similar apparatus upon the closure of said valve.

5. Spraying apparatus of the kind described comprising in combination a water chamber supplied with water under pressure, an outlet pipe leading from said water chamber, a nozzle connected to said outlet pipe, a reciprocating valve controlling the flow of water through said pipe, a stem on said valve, a weighted lever, a rod connected to said lever and having a cup-shaped end loosely receiving said stem, means connecting the stem to the cup, said means coöperating with said cup to permit relative lateral movement between said stem and rod, and means for operating said lever by the pressure of the water to close said valve automatically after a predetermined time.

6. Spraying apparatus of the kind described comprising in combination a water chamber, a cylinder connected thereto, a piston adapted to reciprocate in the cylinder, a reservoir above the cylinder, a union between the cylinder and reservoir, a hollow plug screwed into the union and having a tapered groove and a port, a valve upon the plug, a stem and wings for adjusting the plug, a weighted lever in the chamber, a chain connecting the piston and the lever, a pipe and sprayer connected to the chamber; a valve adapted to control the flow through the pipe, and a rod connecting the weighted lever to the valve.

In testimony whereof I have signed my name to this specification in the presence of two witnesses.

DONALD ELDER.

Witnesses:
ARTHUR LEWITT FERNEYHOUGH,
MARGARET ESTHER HEIGHWAY.